United States Patent
Azizi et al.

(10) Patent No.: US 12,355,688 B2
(45) Date of Patent: Jul. 8, 2025

(54) APPARATUS, SYSTEM, AND METHOD OF WIRELESS COMMUNICATION DURING A SHORT-INTER-FRAME-SPACE (SIFS)

(71) Applicant: INTEL CORPORATION, Santa Clara, CA (US)

(72) Inventors: Shahrnaz Azizi, Cupertino, CA (US); Robert Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 594 days.

(21) Appl. No.: 17/561,528

(22) Filed: Dec. 23, 2021

(65) Prior Publication Data
US 2022/0123882 A1  Apr. 21, 2022

(51) Int. Cl.
*H04L 5/00* (2006.01)
(52) U.S. Cl.
CPC .......... *H04L 5/0037* (2013.01); *H04L 5/0055* (2013.01); *H04L 5/0064* (2013.01)
(58) Field of Classification Search
CPC ... H04L 5/0037; H04L 5/0055; H04L 5/0064; H04L 5/0053; H04L 5/0091; H04L 1/0023; H04W 74/0816
See application file for complete search history.

(56) References Cited

U.S. PATENT DOCUMENTS

2023/0379760 A1* 11/2023 Huang ................. H04W 74/06
2024/0188129 A1*  6/2024 Ciochina-Kar ..... H04W 72/541

OTHER PUBLICATIONS

IEEE Standard for Information Technology—Telecommunications and Information Exchange between Systems Local and Metropolitan Area Networks-Specific Requirements, Part 11: Wireless LAN Medium Access Control (MAC) and Physical Layer (PHY) Specifications, IEEE Computer Society, IEEE Std 802.11™—2020 (Revision of IEEE Std 802.11-2016), Approved Dec. 3, 2020, 4379 pages.

* cited by examiner

*Primary Examiner* — Jae Y Lee
*Assistant Examiner* — Nhu Pham
(74) *Attorney, Agent, or Firm* — Shichrur & Co.

(57) ABSTRACT

In one example, a first wireless communication station (STA) may be configured to identify an estimated end of a frame transmitted from a second STA to an Access point (AP); and to transmit a transmission to the AP within a Short-Inter-Frame-Space (SIFS) beginning at the estimated end of the frame from the second STA. For example, a duration of the transmission may be no longer than the SIFS. For example, the transmission to the AP may be on a same wireless communication channel as the frame from the second STA. In another example, an AP may be configured to process a frame from a first STA; and to process a transmission from a second STA, the transmission from the second STA received within a SIFS beginning at an end of the frame from the first STA.

25 Claims, 6 Drawing Sheets

APPARATUS, SYSTEM, AND METHOD OF WIRELESS COMMUNICATION DURING A SHORT-INTER-FRAME-SPACE (SIFS)

TECHNICAL FIELD

Aspects described herein generally relate to wireless communication during a Short-Inter-Frame-Space (SIFS).

BACKGROUND

Some wireless communication networks may provide high-throughput data for users of wireless communication devices.

There is a need for technical solutions to provide increased and/or efficient access to the wireless communication medium.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
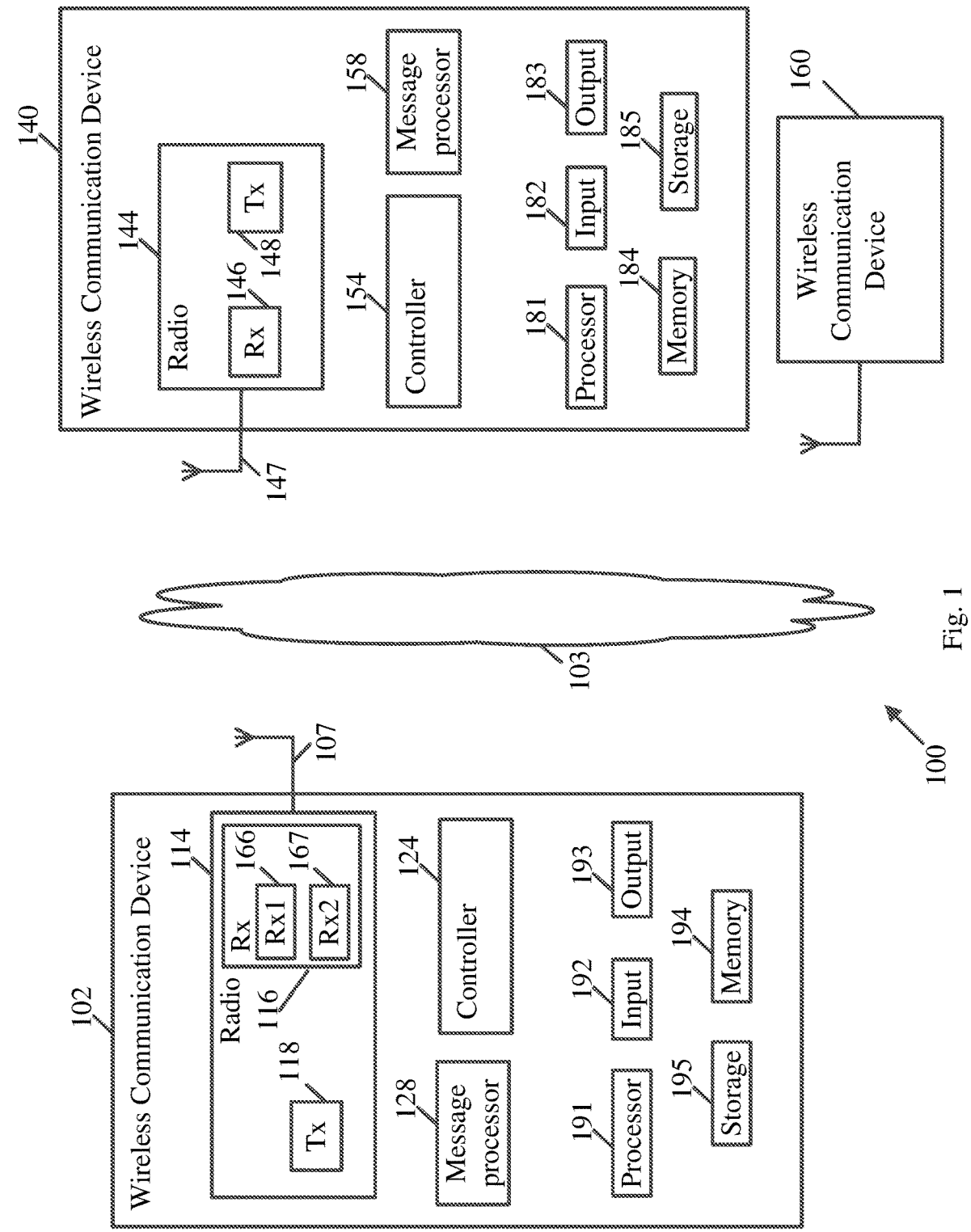
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December,* 2020); and/or IEEE 802.11be (IEEE *P802.11be/ D1.2 Draft Standard for Information technology—Telecommunications and information exchange between systems Local and metropolitan area networks—Specific requirements; Part* 11: *Wireless LAN Medium Access Control (MAC) and Physical Layer (PHY) Specifications; Amendment* 8: *Enhancements for extremely high throughput (EHT), September* 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stack, buffers, and/or the like, coupled to the one or more processors, e.g., as necessary to execute the logic.

Some demonstrative aspects may be used in conjunction with a WLAN, e.g., a Wi-Fi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Some demonstrative aspects may be implemented by an Extremely High Throughput (EHT) STA, which may include for example, a STA having a radio transmitter, which is capable of operating on a channel that is in frequency bands between 1 GHz and 7.250 Ghz. The EHT STA may perform other additional or alternative functionality. Other aspects may be implemented by any other apparatus, device and/or station.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, a wireless communication device 160, and/or one or more other devices.

In some demonstrative aspects, devices 102, 140, and/or 160 may include a mobile device or a non-mobile, e.g., a static, device.

For example, devices 102, 140, and/or 160 may include, for example, a UE, an MD, a STA, an AP, a Smartphone, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a video source, an audio source, a video sink, an audio sink, a stereo tuner, a broadcast radio receiver, a digital audio player, a speaker, an audio receiver, an audio amplifier, a gaming device, a data source, a data sink, a media player, a television, a music player, a smart device such as, for example, lamps, climate control, car components, household components, appliances, and the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 may execute instructions, for example, of an Operating System (OS) of device 102 and/or of one or more suitable applications. Processor 181 may execute instructions, for example, of an OS of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a disk drive, a solid-state drive (SSD), and/or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102, 140, and/or 160 may be capable of communicating content, data, information and/or signals via a wireless medium (WM) 103. In some demonstrative aspects, wireless medium 103 may include, for example, a radio channel, a cellular channel, an RF channel, a Wi-Fi channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band. In other aspects, WM 103 may include any other type of channel over any other frequency band.

In some demonstrative aspects, device 102, device 140, and/or device 160 may include one or more radios including circuitry and/or logic to perform wireless communication between devices 102, 140, 160, and/or one or more other wireless communication devices. For example, device 102 may include at least one radio 114, and/or device 140 may include at least one radio 144.

In some demonstrative aspects, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative aspects, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative aspects, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, a mmWave band, and/or any other band, for example, a 5G band, an SIG band, and/or any other band.

In some demonstrative aspects, radios 114 and/or 144 may include, or may be associated with one or more, e.g., a plurality of, antennas.

In some demonstrative aspects, device 102 may include one or more, e.g., a single antenna or a plurality of, antennas 107, and/or device 140 may include one or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a single antenna, a plurality of antennas, a phased array antenna, a multiple element antenna, a set of switched beam antennas, and/or the like. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, antennas 107 and/or antennas 147 may be connected to, and/or associated with, one or more Radio Frequency (RF) chains.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, 160 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, 160 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other aspects, controller 154, message processor 158 and/or radio 144 may be implemented by one or more additional or alternative elements of device 140.

In some demonstrative aspects, device 102, device 140, and/or device 160 may include, operate as, perform the role of, and/or perform one or more functionalities of, one or more STAs. For example, device 102 may include at least one STA, device 140 may include at least one STA, and/or device 160 may include at least one STA.

In some demonstrative aspects, device 102, device 140, and/or device 160 may include, operate as, perform the role of, and/or perform one or more functionalities of, one or more EHT STAs. For example, device 102 may include, operate as, perform the role of, and/or perform one or more functionalities of, at least one EHT STA; device 140 may include, operate as, perform the role of, and/or perform one or more functionalities of, at least one EHT STA; and/or device 160 may include, operate as, perform the role of, and/or perform one or more functionalities of, at least one EHT STA.

In other aspects, devices 102, 140 and/or 160 may include, operate as, perform the role of, and/or perform one or more functionalities of, any other wireless device and/or station, e.g., a WLAN STA, a Wi-Fi STA, and the like.

In some demonstrative aspects, device 102, device 140, and/or device 160 may be configured operate as, perform the role of, and/or perform one or more functionalities of, an access point (AP), e.g., an EHT AP, or any other AP.

In some demonstrative aspects, device 102, device 140, and/or device 160 may be configured to operate as, perform the role of, and/or perform one or more functionalities of, a non-AP STA, e.g., an EHT non-AP STA, or any other non-AP STA.

In other aspects, device 102, device 140, and/or device 160 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects devices 102, 140 and/or 160 may be configured to communicate over an EHT network, and/or any other network. For example, devices 102, 140 and/or 160 may perform Multiple-Input-Multiple-Output (MIMO) communication, for example, for communicating over the EHT networks, e.g., over an EHT frequency band, e.g., in frequency bands between 1 GHz and 7.250 GHz.

In some demonstrative aspects, devices 102, 140 and/or 160 may be configured to operate in accordance with one or more Specifications, for example, including one or more IEEE 802.11 Specifications, e.g., an IEEE 802.11-2020 Specification, an IEEE 802.11be Specification, and/or any other specification and/or protocol.

In some demonstrative aspects, devices 102, 140 and/or 160 may be configured according to one or more standards, for example, in accordance with an IEEE 802.11be Standard, which may be configured, for example, to enhance the efficiency and/or performance of an IEEE 802.11 Specification, which may be configured to provide Wi-Fi connectivity.

Some demonstrative aspects may enable, for example, to significantly increase the data throughput defined in the IEEE 802.11-2020 Specification, for example, up to a throughput of 30 Giga bits per second (Gbps), or to any other throughput, which may, for example, satisfy growing demand in network capacity for new coming applications.

Some demonstrative aspects may be implemented, for example, to support increasing a transmission data rate, for example, by applying MIMO and/or Orthogonal Frequency Division Multiple Access (OFDMA) techniques.

In some demonstrative aspects, devices 102, 140 and/or 160 may be configured to communicate MIMO communications and/or OFDMA communication in frequency bands between 1 GHz and 7.250 GHz.

In some demonstrative aspects, device 102, 140 and/or device 160 may be configured to support one or more mechanisms and/or features, for example, OFDMA, Single User (SU) MIMO, and/or Multi-User (MU) MIMO, for example, in accordance with an IEEE 802.11be Standard and/or any other standard and/or protocol.

In some demonstrative aspects, device 102, 140 and/or device 160 may include, operate as, perform a role of, and/or perform the functionality of, one or more EHT STAs. For example, device 102 may include, operate as, perform a role of, and/or perform the functionality of, at least one EHT STA, device 140 may include, operate as, perform a role of, and/or perform the functionality of, at least one EHT STA, and/or device 160 may include, operate as, perform a role of, and/or perform the functionality of, at least one EHT STA.

In some demonstrative aspects, devices 102, 140 and/or 160 may implement a communication scheme, which may include Physical layer (PHY) and/or Media Access Control (MAC) layer schemes, for example, to support one or more applications, and/or increased throughput, e.g., throughputs up to 30 Gbps, or any other throughput.

In some demonstrative aspects, the PHY and/or MAC layer schemes may be configured to support OFDMA techniques, SU MIMO techniques, and/or MU MIMO techniques.

In some demonstrative aspects, devices 102, 140 and/or 160 may be configured to implement one or more mechanisms, which may be configured to enable SU and/or MU communication of Downlink (DL) and/or Uplink frames (UL) using a MIMO scheme.

In some demonstrative aspects, device 102, 140 and/or device 160 may be configured to implement one or more MU communication mechanisms. For example, devices 102, 140 and/or 160 may be configured to implement one or more MU mechanisms, which may be configured to enable MU communication of DL frames using a MIMO scheme, for example, between a device, e.g., device 102, and a plurality of devices, e.g., including device 140, device 160, and/or one or more other devices.

In some demonstrative aspects, devices 102, 140, and/or 160 may be configured to communicate over an EHT network, and/or any other network and/or any other frequency band. For example, devices 102, 140, and/or 160 may be configured to communicate DL transmissions and/or UL transmissions, for example, for communicating over the EHT networks.

In some demonstrative aspects, devices 102, 140 and/or 160 may be configured to communicate over a channel bandwidth, e.g., of at least 20 Megahertz (MHz), in frequency bands between 1 GHz and 7.250 GHz.

In some demonstrative aspects, devices 102, 140 and/or 160 may be configured to implement one or more mechanisms, which may, for example, support communication over a wide channel bandwidth (BW) ("channel width") (also referred to as a "wide channel" or "wide BW") covering two or more channels, e.g., two or more 20 MHz channels, e.g., as described below.

In some demonstrative aspects, wide channel mechanisms may include, for example, a mechanism and/or an operation whereby two or more channels, e.g., 20 MHz channels, can be combined, aggregated or bonded, e.g., for a higher bandwidth of packet transmission, for example, to enable achieving higher throughputs, e.g., when compared to transmissions over a single channel. Some demonstrative aspects are described herein with respect to communication over a channel BW including two or more 20 MHz channels, however other aspects may be implemented with respect to communications over a channel bandwidth, e.g., a "wide" channel, including or formed by any other number of two or more channels, for example, a bonded or aggregated channel including a bonding or an aggregation of two or more channels.

In some demonstrative aspects, device 102, 140 and/or device 160 may be configured to communicate one or more transmissions over one or more channel BWs, for example, including a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative aspects, devices 102, 140 and/or 160 may be configured to generate, process, transmit and/or receive a Physical Layer (PHY) Protocol Data Unit (PPDU) having a PPDU format (also referred to as "EHT PPDU format"), which may be configured, for example, for communication between EHT stations, e.g., as described below.

In some demonstrative aspects, a PPDU, e.g., an EHT PPDU, may include at least one non-EHT field, e.g., a legacy field, which may be identified, decodable, and/or processed by one or more devices ("non-EHT devices", or "legacy devices"), which may not support one or more features and/or mechanisms ("non-legacy" mechanisms or "non-EHT mechanisms"). For example, the legacy devices may include non-EHT stations and/or non-High Throughput (HT) stations, which may be, for example, configured according to an IEEE 802.11-2020 Standard, and the like.

Figure 2:
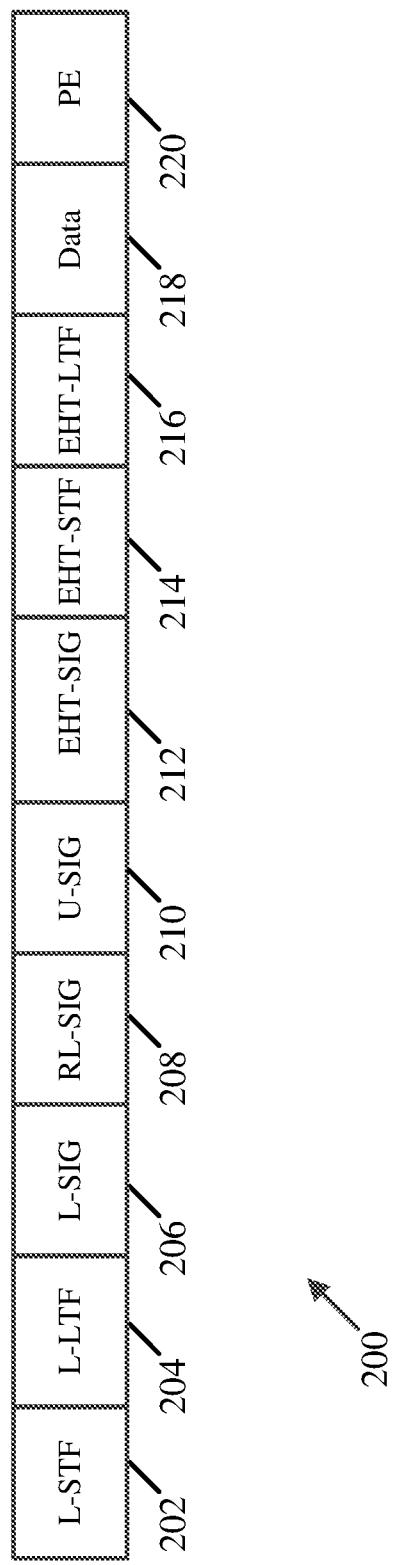
FIG. 2 is a schematic illustration of an Extremely High Throughput (EHT) Physical layer (PHY) Protocol Data Unit (PPDU) format, which may be implemented in accordance with some demonstrative aspects.

Reference is made to FIG. 2, which schematically illustrates an EHT PPDU format 200, which may be implemented in accordance with some demonstrative aspects. In one example, devices 102 (FIG. 1), 140 (FIG. 1), and/or 160 (FIG. 1) may be configured to generate, transmit, receive and/or process one or more EHT PPDUs having the structure and/or format of EHT PPDU 200.

In one example, devices 102 (FIG. 1), 140 (FIG. 1), and/or 160 (FIG. 1) may communicate EHT PPDU 200, for example, as part of a transmission over a channel, e.g., an EHT channel, having a channel bandwidth including one or more 20 MHz channels, for example, a channel BW of 20 MHz, a channel BW of 40 MHz, a channel BW of 80 MHz, a channel BW of 160 MHz, a channel BW of 320 MHz, and/or any other additional or alternative channel BW, e.g., as described below.

In some demonstrative aspects, EHT PPDU 200 may include an EHT SU PPDU, which may be utilized for transmission from an EHT STA, e.g., an EHT STA implemented by device 102 (FIG. 1), to another STA, e.g., an EHT STA implemented by device 140 (FIG. 1).

In some demonstrative aspects, EHT PPDU 200 may include an EHT MU PPDU, which may be utilized for transmission from an EHT STA, e.g., an EHT STA implemented by device 102 (FIG. 1), to one or more users, for example, one or more EHT STAs, including an EHT STA implemented by device 140 (FIG. 1) and/or an EHT STA implemented by device 160 (FIG. 1).

In some demonstrative aspects, as shown in FIG. 2, EHT PPDU 200 may include a non-High Throughput (non-HT) (legacy) Short Training Field (STF) (L-STF) 202, followed by a non-HT (Legacy) Long Training Field (LTF) (L-LTF) 204, which may be followed by a non-HT Signal (SIG) (L-SIG) field 206.

In some demonstrative aspects, as shown in FIG. 2, EHT PPDU 200 may include a repeated non-HT SIG (RL-SIG) field 208, which may follow the L-SIG field 206. The RL-SIG field 208 may be followed by a Universal SIG (U-SIG) field 210.

In some demonstrative aspects, as shown in FIG. 2, EHT PPDU 200 may include a plurality of EHT-modulated fields, e.g., following the U-SIG field 210.

In some demonstrative aspects, as shown in FIG. 2, the EHT modulated fields may include, for example, an EHT Signal (EHT-SIG) field 212.

In some demonstrative aspects, as shown in FIG. 2, the EHT modulated fields may include, for example, an EHT STF (EHT-STF) field 214, e.g., following the EHT-SIG field 212.

In some demonstrative aspects, as shown in FIG. 2, the EHT modulated fields may include, for example, an EHT LTF (EHT-LTF) field 216, e.g., following the EHT-STF field 214.

In some demonstrative aspects, as shown in FIG. 2, the EHT modulated fields may include, for example, a data field 218, e.g., following the EHT-LTF field 216, and/or a Packet Extension (PE) field 220, e.g., following the data field 218.

In some demonstrative aspects, EHT PPDU 200 may include some or all of the fields shown in FIG. 2 and/or one or more other additional or alternative fields.

Referring back to FIG. 1, in some demonstrative aspects, devices 102, 140, and/or 160 may be configured to generate, transmit, receive and/or process one or more transmissions, e.g., including one or more EHT PPDUs, e.g., as described below.

In some demonstrative aspects, for example, devices 102, 140, and/or 160 may be configured to perform one or more operations, and/or functionalities of an EHT STA, which may be configured, for example, to generate, transmit, receive and/or process one or more transmissions, e.g., including one or more EHT PPDUs, e.g., including one or more fields according to the EHT PPDU format of FIG. 2.

In some demonstrative aspects, devices 102, 140, and/or 160 may be configured to generate, transmit, receive and/or process an EHT PPDU, e.g., in accordance with an IEEE 802.11be Specification and/or any other specification, e.g., as described below.

In some demonstrative aspects, for example, devices 102, 140, and/or 160 may be configured to perform one or more operations, and/or functionalities of an EHT STA, which may be configured, for example, to generate, transmit, receive and/or process the EHT PPDU as an EHT MU PPDU, for example, in accordance with the EHT PPDU formal 200 (FIG. 2).

In some demonstrative aspects, the EHT MU PPDU may include a PPDU that carries one or more PHY service data units (PSDUs) for one or more STAs using a downlink multi-user multiple input, multiple output (DL-MU-MIMO) technique, an orthogonal frequency division multiple access (DL OFDMA) technique, or a combination of the two techniques.

In some demonstrative aspects, for example, devices 102, 140 and/or 160 may be configured to perform one or more operations, and/or functionalities of an EHT STA, which may be configured, for example, to generate, transmit, receive and/or process the EHT MU PPDU, for example, over a 20 MHz channel width, a 40 MHz channel width, a 80 MHz channel width, a 160 MHz channel width, and/or a 320 Mhz channel width.

In other aspects, any other additional or alternative channel width may be utilized.

In some demonstrative aspects, devices 102, 140 and/or 160 may be configured to implement a low-latency wireless communication mechanism, which may be configured to provide a technical solution to support low-latency transmissions, e.g., very-low latency or ultra-low latency transmissions, in a wireless communication network, for example, a Wi-Fi network, e.g., as described below.

In some demonstrative aspects, the low-latency wireless communication mechanism may be configured to provide a technical solution to support emerging time-sensitive wireless communications, e.g., as described below.

In some demonstrative aspects, the low-latency wireless communication mechanism may be configured to provide a technical solution to support "very-low-collision-rate" short transmissions from one or more first stations, e.g., client stations, to a second station, e.g., an AP STA, as described below.

In some demonstrative aspects, the low-latency wireless communication mechanism may be configured to provide a technical solution to support short transmissions, e.g., "very-low-collision-rate" short transmissions, from a station, e.g., a client station, for example, when high-priority data, e.g., urgent data, arrives at the station and is to be transmitted in an uplink transmission to an AP, e.g., as described below.

In some demonstrative aspects, the low-latency wireless communication mechanism may be implemented by the client STA to transmit an uplink transmission including the high priority data to the AP, e.g., as described below.

In some demonstrative aspects, the low-latency wireless communication mechanism may be implemented by the client STA to transmit an urgent request to the AP, in order to request the AP to provide to the client STA a triggered uplink transmission slot from the AP, e.g., as described below.

In some demonstrative aspects, the low-latency wireless communication mechanism may be implemented by the client STA to transmit the urgent request to the AP as part of a short packet format, for example, a very short packet format with a very short duration, e.g., a duration of less than 14 microseconds (usec), or any other duration, e.g., as described below.

In some demonstrative aspects, the low-latency wireless communication mechanism may be implemented by the client STA to transmit the urgent request to the AP, for example, even without channel access delay, e.g., as described below.

In some demonstrative aspects, it may not be efficient to implement an Enhanced Distributed Channel Access (EDCA) Quality of Service (QoS) mechanism for transmitting the urgent transmission from the client STA to the AP. For example, the EDCA QoS mechanism may suffer from inherited EDCA contention-based delays.

In some demonstrative aspects, it may not be efficient to transmit the urgent transmission from the client STA on top of an ongoing transmission, for example, as this mechanism may suffer a high probability of collision, which may result in reduced network efficiency.

In some demonstrative aspects, devices 102, 140 and/or 160 may be configured to implement a low-latency wireless communication mechanism, which may be configured to provide a technical solution to utilize an existing Short-Inter-Frame-Space (SIFS) period, which may be a quiet period, for a transmission, e.g., an urgent transmission, between a client STA and an AP, e.g., as described below.

In some demonstrative aspects, a STA, e.g., a STA implemented by device 140, may be configured to perform a transmission during a SIFS following another transmission, e.g., as described below.

In some demonstrative aspects, a first STA, e.g., the STA implemented by device 140, may be configured to perform a transmission to an AP, e.g., an AP implemented by device 102, for example, during a SIFS following another transmission communicated between the AP and a second STA, for example, a STA implemented by device 160, e.g., as described below.

In some demonstrative aspects, the first STA, e.g., the STA implemented by device 140, may utilize the SIFS to make a short transmission, e.g., an urgent transmission, to the AP, for example, without causing any collision with other transmissions, e.g., as described below.

In some demonstrative aspects, a transmitter side, e.g., the STA implemented by device 140, which is to perform a transmission during the SIFS following another, ongoing, transmission, may be configured to determine and/or predict, for example, when the ongoing transmission is expected to end.

In some demonstrative aspects, the transmitter side, e.g., the STA implemented by device 140, may be configured to tailgate its own transmission, for example, in the SIFS following the other transmission.

In some demonstrative aspects, a receiver side, e.g., the AP implemented by device 102, may be configured to receive the transmission from the transmitter side. For example, the receiver side, e.g., the AP implemented by device 102, may be configured to implement parallel circuitry, for example, to receive the tailgated transmission, e.g., in parallel to reception of other, e.g., "normal", frames.

In some demonstrative aspects, the wireless communication mechanism utilizing the SIFS period for transmission, e.g., as described herein, may be implemented to provide a technical solution to support low-latency transmission, for example, in accordance with one or more existing protocols, e.g., one or more existing IEEE 802.11 Protocols.

In some demonstrative aspects, the wireless communication mechanism utilizing the SIFS period for transmission, e.g., as described herein, may be implemented to provide a technical solution to support low-latency transmission, for example, in a manner that is backward compatible and/or co-exists with current protocols.

In some demonstrative aspects, the wireless communication mechanism utilizing the SIFS period for transmission, e.g., as described herein, may be implemented to provide a technical solution to support time-sensitive communications, e.g., of time-sensitive applications.

In some demonstrative aspects, the wireless communication mechanism utilizing the SIFS period for transmission, e.g., as described herein, may be configured in accordance with a definition of Inter-Frame Spaces (IFS), which may be utilized to control a medium access Mechanism, for example, in accordance with an IEEE 802.11 Specification.

For example, a SIFS may be defined, e.g., in accordance with an IEEE 802.11 Specification, to be a shortest quiet interval, which may be used, for example, in between packet transmissions to/from a STA/AP.

For example, a SIFS may be defined, e.g., in accordance with an IEEE 802.11 Specification, to be shorter than other IFS periods, e.g., a Point Coordination Function (PCF) IFS (PIFS), a Distributed Coordination Function (DCF) IFS (DIFS), and/or an Arbitration IFS (AIFS).

For example, the SIFS may be considered as the required Rx to Tx turnaround time, when a STA receiving a frame needs to complete a receive procedure before transmitting a frame, e.g., an Acknowledgement (ACK), a Clear to Send (CTS), or any other frame, back in response to the received frame. For example, a device may typically need about 2 usec to transition from Rx to Tx circuitry.

For example, based on this operation, the SIFS interval may be assumed to be quiet, e.g., almost always. For example, the SIFS interval may be assumed to be quiet and not used for any transmission, for example, except for some "corner" cases of undiscovered hidden nodes, e.g., where collision may be unavoidable.

In some demonstrative aspects, a short transmission performed during the SIFS may most probably not cause any harm to a Wi-Fi network.

In some demonstrative aspects, devices 102, 140 and/or 160 may be configured to implement a mechanism for communication during the SIFS period, which may provide a technical solution to utilize a SIFS quiet interval for transmission of a short packet, for example, in a way that is detectable and/or decodable at the intended receiver, e.g., as described below.

In some demonstrative aspects, controller 154 may be configured to control, trigger, cause, and/or instruct a first STA, e.g., a STA implemented by device 140, to identify an estimated end of a frame transmitted from a second STA, e.g., a STA implemented by device 160, to an AP, e.g., an AP implemented by device 102, e.g., as described below.

In some demonstrative aspects, controller 154 may be configured to control, trigger, cause, and/or instruct the first STA, e.g., the STA implemented by device 140, to transmit a transmission to the AP, e.g., the AP implemented by device 102, for example, within a Short-Inter-Frame-Space (SIFS) beginning at the estimated end of the frame from the second STA, e.g., as described below.

In some demonstrative aspects, controller 154 may be configured to control, trigger, cause, and/or instruct the first STA, e.g., the STA implemented by device 140, to configure the transmission to the AP, e.g., the AP implemented by device 102, to be on a same wireless communication channel as the frame from the second STA, e.g., the STA implemented by device 160.

In some demonstrative aspects, controller 154 may be configured to control, trigger, cause, and/or instruct the first STA, e.g., the STA implemented by device 140, to configure a duration of the transmission to be no longer than the SIFS, e.g., as described below.

In some demonstrative aspects, controller 154 may be configured to control, trigger, cause, and/or instruct the first STA, e.g., the STA implemented by device 140, to identify the estimated end of the frame from the second STA, e.g., the STA implemented by device 160, for example, based on a header of the frame from the second STA.

In some demonstrative aspects, controller 154 may be configured to control, trigger, cause, and/or instruct the first STA, e.g., the STA implemented by device 140, to identify the estimated end of the frame from the second STA, e.g., the STA implemented by device 160, for example, based on a detected signal level of the frame from the second STA.

In other aspects, controller 154 may be configured to control, trigger, cause, and/or instruct the first STA, e.g., the STA implemented by device 140, to identify the estimated end of the frame from the second STA, e.g., the STA implemented by device 160, for example, based on any other additional or alternative detection mechanism and/or criteria.

In some demonstrative aspects, a difference between the SIFS and the duration of the transmission from the first STA to the AP may be at least a predefined time duration, e.g., as described below.

In some demonstrative aspects, the duration of the transmission from the first STA to the AP may be at least 2 microseconds shorter than the SIFS.

In other aspects, the duration of the transmission from the first STA to the AP may be shorter than the SIFS, e.g., by any other time period.

In some demonstrative aspects, the SIFS may be less than 20 microseconds.

In some demonstrative aspects, the SIFS may be 16 microseconds.

In some demonstrative aspects, the SIFS may be less than 16 microseconds.

In other aspects, the SIFS may have any other duration, for example, as may be defined in accordance with an IEEE 802.11 Standard and/or any other standard or protocol.

In some demonstrative aspects, the transmission from the first STA to the AP may include a data frame from the first STA, e.g., as described below.

For example, controller 154 may be configured to control, trigger, cause, and/or instruct the STA implemented by device 140 to transmit a data frame to the AP implemented by device 102, for example, during the SIFS beginning at the estimated end of the frame from the STA implemented by device 160 to the AP implemented by device 102.

In some demonstrative aspects, controller 154 may be configured to control, trigger, cause, and/or instruct the first STA, e.g., the STA implemented by device 140, to configure the transmission from the first STA, e.g., the STA implemented by device 140, to the AP, e.g., the AP implemented by device 102, to indicate a request to transmit data from the first STA to the AP, e.g., as described below.

In some demonstrative aspects, controller 154 may be configured to control, trigger, cause, and/or instruct the first STA, e.g., the STA implemented by device 140, to attempt to receive from the AP, e.g., the AP implemented by device 102, a response to the request to transmit data from the first STA to the AP, e.g., as described below.

In some demonstrative aspects, the response from the AP may include a trigger frame from the AP, for example, to trigger an Uplink (UL) transmission from the first STA, e.g., as described below.

In some demonstrative aspects, the response from the AP may include an acknowledgment (ACK) from the AP, for example, to acknowledge the request to transmit data from the first STA to the AP, e.g., as described below.

In some demonstrative aspects, controller 154 may be configured to control, trigger, cause, and/or instruct the first STA, e.g., the STA implemented by device 140, to attempt to receive the ACK from the AP, for example, within another SIFS, for example, a SIFS following an ACK from the AP to the second STA, e.g., as described below.

For example, controller 154 may be configured to control, trigger, cause, and/or instruct the STA implemented by device 140 to attempt to receive the ACK from the AP implemented by device 102, for example, within a SIFS following an ACK from the AP implemented by device 102 to the STA implemented by device 160.

In some demonstrative aspects, controller 154 may be configured to control, trigger, cause, and/or instruct the first STA, e.g., the STA implemented by device 140, to configure the transmission to the AP to include a predefined signaling sequence to indicate the request to transmit data from the first STA to the AP, e.g., as described below.

In some demonstrative aspects, controller 154 may be configured to control, trigger, cause, and/or instruct the first STA, e.g., the STA implemented by device 140, to configure the transmission to the AP to include an indication of at least one parameter corresponding to the data to be transmitted from the first STA to the AP, e.g., as described below.

In some demonstrative aspects, the indication of at least one parameter corresponding to the data from the first STA to the AP may include an indication of at least one of a data size of the data from the first STA, and/or a Quality of Service (QoS) requirement.

In other aspects, the indication of at least one parameter corresponding to the data from the first STA to the AP may include an indication of any other additional or alternative parameter.

In some demonstrative aspects, controller 124 may be configured to control, trigger, cause, and/or instruct an AP implemented by device 102 to process a frame from a first STA, e.g., as described below.

For example, controller 124 may be configured to control, trigger, cause, and/or instruct the AP implemented by device 102 to process a frame from the STA implemented by device 160.

In some demonstrative aspects, controller 124 may be configured to control, trigger, cause, and/or instruct the AP implemented by device 102 to process a transmission from a second STA, which is received from the second STA within a SIFS beginning at an end of the frame from the first STA, e.g., as described below.

For example, controller 124 may be configured to control, trigger, cause, and/or instruct the AP implemented by device 102 to process a transmission from the STA implemented by device 140, which is received within a SIFS beginning at an end of the frame from the STA implemented by device 160.

In some demonstrative aspects, a duration of the transmission from the second STA, e.g., the STA implemented by device 140, may be no longer than the SIFS, e.g., as described below.

In some demonstrative aspects, the transmission from the second STA, e.g., the STA implemented by device 140, may be on a same wireless communication channel as the frame from the first STA, e.g., the STA implemented by device 160.

In some demonstrative aspects, controller 124 may be configured to control, trigger, cause, and/or instruct the AP implemented by device 102 to decode the transmission from the second STA, e.g., the transmission from the STA implemented by device 140, in parallel to decoding of the frame from the first STA, e.g., the frame from the STA implemented by device 160, as described below.

In some demonstrative aspects, receiver 116 may include first Receive (Rx) circuitry 166 to receive the frame from the first STA, and second Rx circuitry 167 to detect the transmission from the second STA.

In some demonstrative aspects, a difference between the SIFS and the duration of the transmission from the second STA, e.g., the STA implemented by device 140, to the AP implemented by device 102 may be at least a predefined time duration, e.g., as described below.

In some demonstrative aspects, the duration of the transmission from the second STA, e.g., the STA implemented by device 140, to the AP implemented by device 102 may be at least 2 microseconds shorter than the SIFS.

In other aspects, the duration of the transmission from the second STA to the AP implemented by device 102 may be shorter than the SIFS, e.g., by any other time period.

In some demonstrative aspects, the SIFS may be less than 20 microseconds.

In some demonstrative aspects, the SIFS may be 16 microseconds.

In some demonstrative aspects, the SIFS may be less than 16 microseconds.

In other aspects, the SIFS may have any other duration, for example, as may be defined in accordance with an IEEE 802.11 Standard and/or any other standard or protocol.

In some demonstrative aspects, the transmission from the second STA to the AP implemented by device 102 may include a data frame from the second STA, e.g., as described below.

For example, controller 124 may be configured to control, trigger, cause, and/or instruct the AP implemented by device 102 to process a data frame from the STA implemented by device 140, for example, during the SIFS beginning at the estimated end of the frame from the STA implemented by device 160 to the AP implemented by device 102.

In some demonstrative aspects, controller 124 may be configured to control, trigger, cause, and/or instruct the AP implemented by device 102 to identify, for example, based on the transmission from the second STA, a request from the second STA, e.g., the STA implemented by device 140, to transmit data to the AP implemented by device 102, e.g., as described below.

In some demonstrative aspects, controller 124 may be configured to control, trigger, cause, and/or instruct the AP implemented by device 102 to identify the request from the second STA to transmit data to the AP, for example, based on a predefined signaling sequence in the transmission from the second STA, e.g., as described below.

In other aspects, controller 124 may be configured to control, trigger, cause, and/or instruct the AP implemented by device 102 to identify the request from the second STA based on any other additional or alternative detection mechanism and/or criteria.

In some demonstrative aspects, controller 124 may be configured to control, trigger, cause, and/or instruct the AP implemented by device 102 to transmit to the second STA, e.g., the STA implemented by device 140, a response to the request from the second STA, e.g., as described below.

In some demonstrative aspects, controller 124 may be configured to control, trigger, cause, and/or instruct the AP implemented by device 102 to transmit the response including a trigger frame to trigger an Uplink (UL) transmission from the second STA, e.g., as described below.

In some demonstrative aspects, controller 124 may be configured to control, trigger, cause, and/or instruct the AP implemented by device 102 to transmit the response including an ACK from the AP implemented by device 102, for example, to acknowledge the request from the second STA, e.g., as described below.

In some demonstrative aspects, controller 124 may be configured to control, trigger, cause, and/or instruct the AP implemented by device 102 to transmit a first ACK from the AP implemented by device 102 to the first STA, e.g., the STA implemented by device 160, for example, to acknowledge the frame from the first STA.

In some demonstrative aspects, controller 124 may be configured to control, trigger, cause, and/or instruct the AP implemented by device 102 to transmit a second ACK from the AP implemented by device 102 to the second STA, e.g., the STA implemented by device 140, for example, within a SIFS following the first ACK, e.g., as described below.

In other aspects, the ACK to the second STA may be transmitted at any other timing.

In some demonstrative aspects, controller 124 may be configured to control, trigger, cause, and/or instruct the AP implemented by device 102 to identify an indication of at least one parameter corresponding to the data from the second STA, for example, based on the transmission from the second STA, e.g., as described below.

In some demonstrative aspects, controller 124 may be configured to control, trigger, cause, and/or instruct the AP implemented by device 102 to transmit to the second STA a trigger frame to trigger an Uplink (UL) transmission from the second STA, for example, based on the at least one parameter corresponding to the data from the second STA.

For example, controller 124 may be configured to control, trigger, cause, and/or instruct the AP implemented by device 102 to identify an indication of at least one parameter corresponding to the data from the STA implemented by device 140, for example, based on the transmission from the STA implemented by device 140, and to transmit to the STA implemented by device 140 a trigger frame to trigger an UL transmission from the STA implemented by device 140, for example, based on the at least one parameter corresponding to the data from the STA implemented by device 140.

In some demonstrative aspects, the at least one parameter corresponding to the data from the second STA may include, for example, an indication of at least one of a data size of the data from the second STA, and/or a QoS requirement, e.g., as described below.

In other aspects, the indication of at least one parameter corresponding to the data from the second STA to the AP may include an indication of any other additional or alternative parameter.

In some demonstrative aspects, devices 102, 140 and/or 160 may be configured to implement a mechanism for communication during the SIFS period, which may be configured to enable transmission of a frame from a first STA, e.g., a short frame, for example, during a SIFS period following a transmission from a second STA, e.g., as described below.

In some demonstrative aspects, such a transmission of the frame (also referred to as a "Tailgated" (TG) transmission) from the first STA may be configured to happen, for example, immediately at, or a very short time after, an end of an ongoing transmission from the second STA.

In some demonstrative aspects, the TG transmission may be configured to last less than the duration of the SIFS.

In some demonstrative aspects, the TG transmission may be delayed with respect to the end of the ongoing transmission from the second STA, for example, in order to allow enough time for a receiver STA, e.g., an AP addressed by the TG transmission, to transition from a Tx mode to an Rx mode.

In one example, an AP may typically capable of transitioning from a Tx mode to an Rx mode, for example, within about 2 usec.

Accordingly, the TG transmission may be delayed by about 2 msec with respect to the end of the ongoing transmission from the second STA.

Accordingly, the duration of the TG transmission may be restricted to be no longer than about SIFS −2 usec.

In one example, the duration of the TG transmission may be restricted to be 14 usec or less, for example, in case the SIFS has a duration of about 16 usec.

In other aspects, any other SIFS duration, TG duration and/or TG delay may be implemented.

In some demonstrative aspects, the TG transmission may be configured to have one or more characteristics, e.g., special characteristics, which may allow the receiver STA to detect and decode the TG transmission, e.g., efficiently.

In some demonstrative aspects, the TG transmission may be configured to include one or more sequences suitable for detection and/or decoding.

For example, the TG transmission may be configured to include one or more sequences suitable for synchronization and signature detection.

For example, the TG transmission may be configured to include one or more sequences having good auto-correlation and/or cross-correlation properties.

For example, the TG transmission may be configured to include a Zadoff Chu (ZC) sequence, one or more Walsh codes, one or more M-sequences, and/or any other sequence.

In some demonstrative aspects, the TG transmission may be configured to embody transmission of a pre-assigned sequence.

In some demonstrative aspects, the TG transmission may be configured to embody transmission of a randomly-selected sequence, for example, a sequence randomly selected from a pool of pre-defined and/or pre-negotiated sequences.

In some demonstrative aspects, the TG transmission may be configured to signal a receiver STA, e.g., an AP, that the STA transmitting the TG transmission has urgent data to transmit.

In some demonstrative aspects, the TG transmission may be configured to signal a receiver STA, e.g., an AP, that the TG transmission carries a short data packet for the receiver STA, e.g., the AP.

Figure 3:
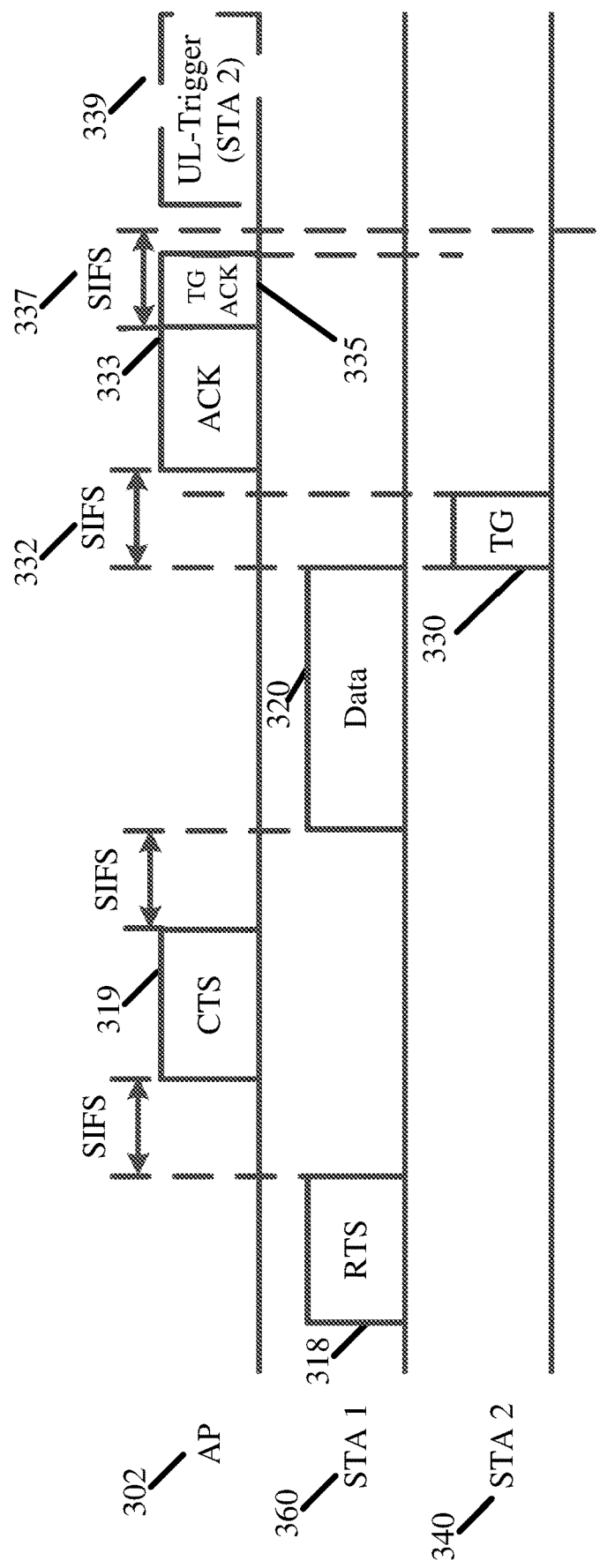
FIG. 3 is a schematic illustration of communications performed by an Access Point (AP), a first wireless communication station (STA), and a second STA, in accordance with some demonstrative aspects.

Reference is made to FIG. 3, which illustrates communications performed by an AP 302, a first STA (STA 1) 360, and a second STA (STA 2) 340, in accordance with some demonstrative aspects. In one example, device 102 (FIG. 1) may perform one or more operations, one or more functionalities, the role of, and/or the functionality of, AP 302; device 140 (FIG. 1) may perform one or more operations, one or more functionalities, the role of, and/or the functionality of, STA 340; and/or device 160 (FIG. 1) may perform one or more operations, one or more functionalities, the role of, and/or the functionality of, STA 360.

In some demonstrative aspects, as shown in FIG. 3, AP 302 and STA 360 may be engaged in an ongoing transmission of data 320, e.g., an uplink transmission from the STA 360 to the AP 302. For example, as shown in FIG. 3, the STA 360 may obtain a wireless medium for the transmission of data 320, for example, based on an exchange of an Request to Send (RTS) 318, e.g., transmitted from the STA 360 to the AP 302, and a Clear to Send (CTS) 319, e.g., transmitted from the AP 302 to the STA 360.

In some demonstrative aspects, as shown in FIG. 3, the STA 340 may listen to the wireless medium, and detect the ongoing transmission of data 320 from the STA 360.

In some demonstrative aspects, the STA 340 may calculate and/or determine an expected end of the ongoing transmission of data 320.

In one example, the STA 340 may determine the expected end of the ongoing transmission of data 320, for example, by decoding a header of the data 320, and obtaining a length of the data transmission 320.

In one example, the STA 340 may determine the expected end of the ongoing transmission of data 320, for example, by detecting an OFDM symbol boundary, e.g., through Guard Interval (GI) detection, for example, along with detection of a drop of the signal level, e.g., by detecting that a quiet interval has started.

In other aspects, the STA 340 may determine the expected end of the ongoing transmission of data 320 according to any other detection mechanism and/or criteria.

In some demonstrative aspects, as shown in FIG. 3, the STA 340 may transmit a TG transmission 330 to the AP 302, for example, during a SIFS 332, for example, immediately following the data transmission 320.

In some demonstrative aspects, the STA 340 may transmit the TG transmission 330 to the AP 302, for example, a predefined time period after the detected and/or calculated end of the data transmission 320.

In one example, the STA 340 may transmit the TG transmission 330 to the AP 302, for example, at least about 2 usec after the detected and/or calculated end of the data transmission 320, e.g., as described above.

In some demonstrative aspects, as shown in FIG. 3, the STA 340 may configure the TG transmission 330 to not be longer than the duration of the SIFS 332.

In some demonstrative aspects, as shown in FIG. 3, the STA 340 may configure the TG transmission 330 to end not later than an end of the duration of the SIFS 332.

In one example, the STA 340 may configure the TG transmission 330 to have a duration of up to about 14 usec, for example, if the SIFS has a duration of 16 usec.

In other aspects, the STA 340 may configure the TG transmission 330 to have any other duration, e.g., based on the duration of the SIFS 332.

In some demonstrative aspects, as shown in FIG. 3, the STA 340 may configure the TG transmission 330 to include an indication, e.g., in the form of a signature sequence, to indicate to the AP 302 that the STA 340 has an urgent packet to transmit.

In some demonstrative aspects, as shown in FIG. 3, the STA 340 may configure the TG transmission 330 to include an indication, e.g., in the form of a signature sequence, to indicate to the AP 302 that the AP 302 is requested to schedule the STA 340 for an UL transmission, e.g., in a next trigger frame.

In some demonstrative aspects, as shown in FIG. 3, the STA 340 may configure the TG transmission 330 to multiplex data, e.g., a short data packet, for example, with its signature.

In some demonstrative aspects, the data included in the TG transmission 330 may include actual data that has to be sent out from the STA 340.

In some demonstrative aspects, the data included in the TG transmission 330 may include data configured to further describe to the AP 302 the request for transmission. In one example, the STA 340 may configure the TG transmission 330 to include a size and/or a QoS requirement of its data, for example, to enable AP 302 to schedule a future trigger-based transmission for the STA 340 accordingly.

In some demonstrative aspects, the STA 340 may be configured to wait for a response from the AP 302, for example, after transmission of the TG 330, e.g., as may be defined by an ACK policy of a protocol.

In some demonstrative aspects, the STA 340 may be configured to perform a retransmission, for example, in the form of another TG, for example, if an expected response is not properly received from the AP 302.

In some demonstrative aspects, the STA 340 may be configured to perform the retransmission using a regular EDCA transmission procedure, e.g., during a later time slot, for example, if the expected response is not properly received from the AP 302.

In some demonstrative aspects, the AP 302 may be capable of supporting communication of TG transmissions. For example, AP 302 may be equipped with a separate Rx-chain, e.g., Rx circuitry 167 (FIG. 1), which may be configured, for example, to detect and decode the TG 330.

In some demonstrative aspects, as shown in FIG. 3, AP 302 may receive and process the data 320, e.g., using the Rx circuitry 166 (FIG. 1), for example, according to any suitable protocol definition.

In some demonstrative aspects, the AP 302 may be configured to engage its RX-TG circuitry, e.g., Rx circuitry 167 (FIG. 1), which may be configured, for example, to search for TG signature detection.

In some demonstrative aspects, the AP 302 may use the RX-TG circuitry, e.g., Rx circuitry 167 (FIG. 1), to detect the TG signature of TG 330.

In some demonstrative aspects, the AP 302 may use the RX-TG circuitry, e.g., Rx circuitry 167 (FIG. 1), to decode the TG 330, for example, based on detection of the TG signature of TG 330.

In some demonstrative aspects, the AP 302 may use the RX-TG circuitry, e.g., Rx circuitry 167 (FIG. 1), to decode the TG 330, for example, in parallel to decoding the data 320, e.g., using the Rx circuitry 166 (FIG. 1).

In some demonstrative aspects, the AP 302 may be configured to transmit an ACK 333 to acknowledge the data 320, e.g., according to any suitable protocol definition.

In some demonstrative aspects, the AP 302 may be configured to prepare and transmit to the STA 340 a response to the TG 330, e.g., as described below.

In some demonstrative aspects, the AP 302 may be configured to transmit a trigger frame 339 configured to trigger an UL transmission from the STA 340.

In some demonstrative aspects, the AP 302 may be configured to configure the trigger frame 339 to trigger the UL transmission from the STA 340, for example, based on information in the TG 330, e.g., as described above.

In some demonstrative aspects, the AP 302 may be configured to transmit another TG frame 335, for example, during a SIFS 337, e.g., immediately after transmission of the ACK 333. For example, as shown in FIG. 3, the AP 302 may transmit the TG 335 as a TG-ACK to STA 340, e.g., to acknowledge the TG 330.

In some demonstrative aspects, the STA 360 may not be aware of, and/or may not be affected by, the TG transmission 330. For example, the STA 360 may continue its operation based on its own protocol. For example, the TG transmission 330 may be completely transparent to STA 360 and/or any other non-TG STAs.

In some demonstrative aspects, AP 302 may configure and/or rearrange its transmit queue and/or one or more power saving policies, for example, based on the transmission of the TG 330 during the SIFS 332 following the data transmission 320.

For example, AP 302 may be configured to give a higher priority to the STA 340 that transmitted the TG 330 during the SIFS 332.

In one example, providing the higher priority to the STA 340 that transmitted the TG 330 during the SIFS 332 may result in one or more changes of procedures with respect to other STAs. For example, if a third STA (not shown in FIG. 3) was expecting data from AP 302, this third STA may now see that in a next trigger frame, the third STA may not receive the data. Accordingly, the third STA may decide to move to a power saving mode. For example, the AP 320 may be aware of these ramifications and handle them correctly.

Figure 4:
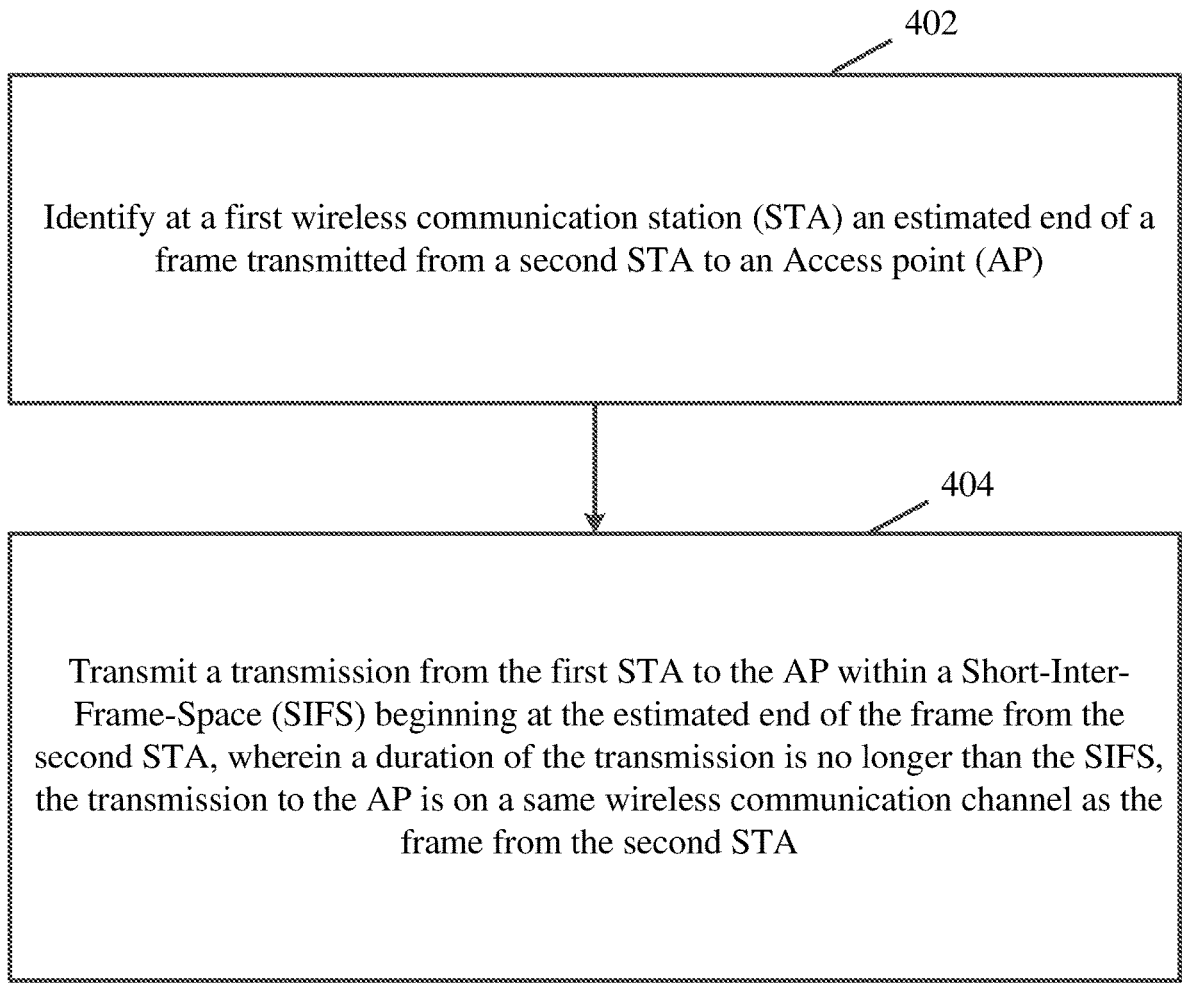
FIG. 4 is a schematic flow-chart illustration of a method of wireless communication during a Short-Inter-Frame-Space (SIFS), in accordance with some demonstrative aspects.

Reference is made to FIG. 4, which schematically illustrates a method of wireless communication during a SIFS, in accordance with some demonstrative aspects. For example, one or more of the operations of the method of FIG. 4 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include identifying at a first STA an estimated end of a frame transmitted from a second STA to an AP. For example, controller 154 (FIG. 1) may be configured to cause, trigger, and/or control a STA implemented by device 140 (FIG. 1) to identify an estimated end of a frame transmitted from a STA implemented by device 160 (FIG. 1) to an AP implemented by device 102 (FIG. 1), e.g., as described above.

As indicated at block 404, the method may include transmitting a transmission from the first STA to the AP during a SIFS beginning at the estimated end of the frame from the second STA, wherein a duration of the transmission is no longer than the SIFS, the transmission to the AP is on a same wireless communication channel as the frame from the second STA. For example, controller 154 (FIG. 1) may be configured to cause, trigger, and/or control a STA implemented by device 140 (FIG. 1) to transmit a transmission, e.g., a TG transmission, from the STA implemented by device 140 (FIG. 1) to the AP implemented by device 102 (FIG. 1), for example, within a SIFS beginning at the estimated end of the frame from the STA implemented by device 160 (FIG. 1), e.g., as described above.

Figure 5:
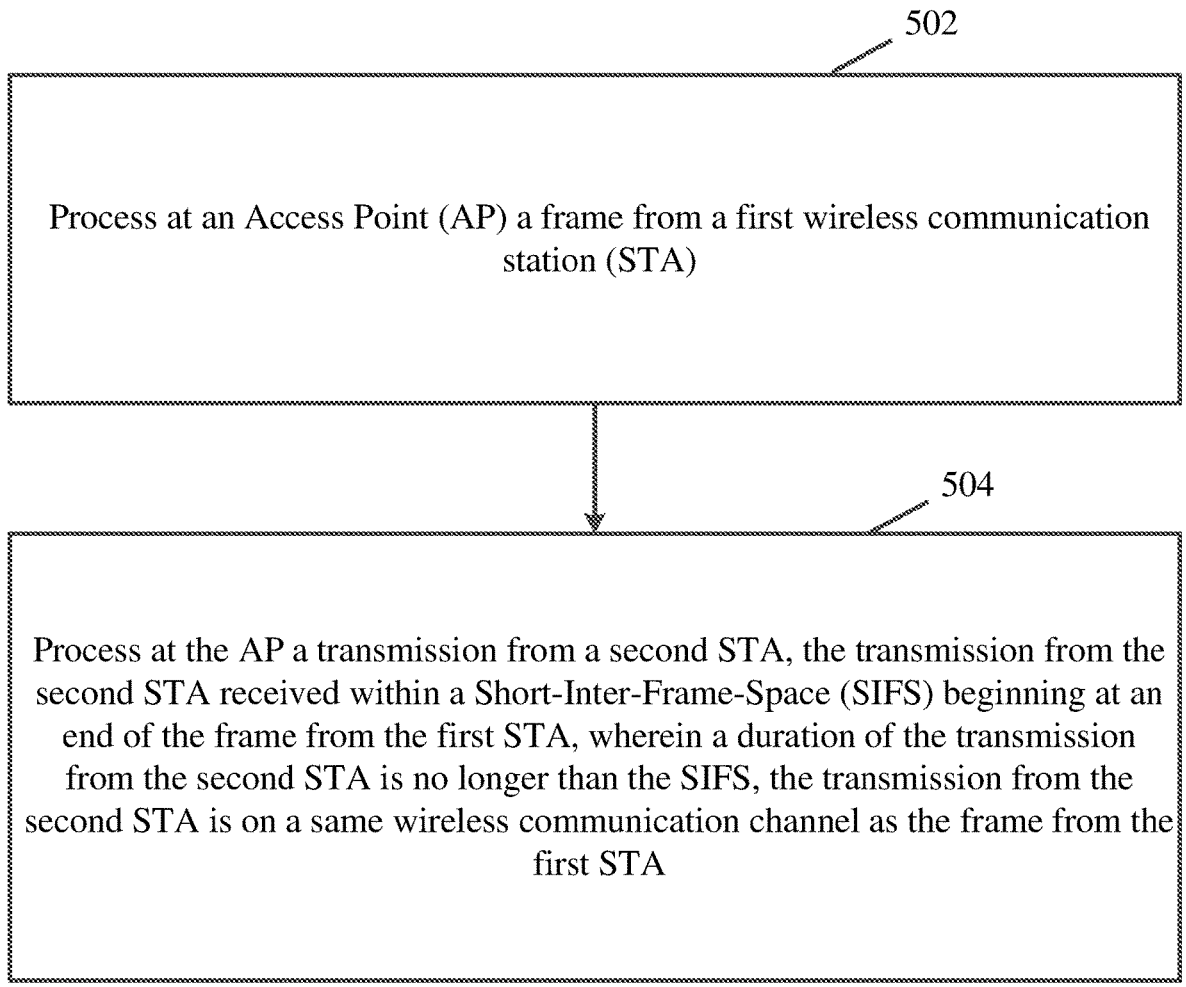
FIG. 5 is a schematic flow-chart illustration of a method of wireless communication during a SIFS, in accordance with some demonstrative aspects.

Reference is made to FIG. 5, which schematically illustrates a method of wireless communication during a SIFS, in accordance with some demonstrative aspects. For example, one or more of the operations of the method of FIG. 5 may be performed by one or more elements of a system, e.g., system 100 (FIG. 1), for example, one or more wireless devices, e.g., device 102 (FIG. 1), device 140 (FIG. 1), and/or device 160 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include processing at an AP a frame from a first STA. For example, controller 124 (FIG. 1) may be configured to cause, trigger, and/or control an AP implemented by device 102 (FIG. 1) to process a frame from a STA implemented by device 160 (FIG. 1), e.g., as described above.

As indicated at block 504, the method may include processing at the AP a transmission from a second STA, the transmission from the second STA received during a SIFS beginning at an end of the frame from the first STA, wherein a duration of the transmission from the second STA is no longer than the SIFS, the transmission from the second STA is on a same wireless communication channel as the frame from the first STA. For example, controller 124 (FIG. 1) may be configured to cause, trigger, and/or control the AP implemented by device 102 (FIG. 1) to process a transmission, e.g., a TG transmission, received from the STA implemented by device 140 (FIG. 1), for example, within a SIFS beginning at the estimated end of the frame from the STA implemented by device 160 (FIG. 1), e.g., as described above.

Figure 6:
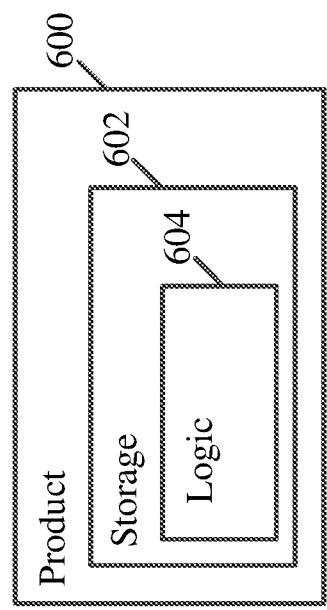
FIG. 6 is a schematic illustration of a product of manufacture, in accordance with some demonstrative aspects.

Reference is made to FIG. 6, which schematically illustrates a product of manufacture 600, in accordance with some demonstrative aspects. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1); to cause device 102 (FIG. 1), device 140 (FIG. 1), device 160 (FIG. 1), controller 124 (FIG. 1), controller 154 (FIG. 1), message processor 128 (FIG. 1), message processor 158 (FIG. 1), radio 114 (FIG. 1), radio 144 (FIG. 1), transmitter 118 (FIG. 1), transmitter 148 (FIG. 1), receiver 116 (FIG. 1), and/or receiver 146 (FIG. 1) to perform, trigger and/or implement one or more operations and/or functionalities; and/or to perform, trigger and/or implement one or more operations and/or functionalities described with reference to the FIGS. 1-5, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 600 and/or machine readable storage media 602 may include one or more types of computer-readable storage media capable of storing data, including volatile memory, non-volatile memory, removable or non-removable memory, erasable or non-erasable memory, writeable or re-writeable memory, and the like. For example, machine readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a hard drive, an optical disk, a magnetic disk, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising logic and/or circuitry configured to cause a first wireless communication station (STA) to identify an estimated end of a frame transmitted from a second STA to an Access point (AP); and transmit a transmission to the AP within a Short-Inter-Frame-Space (SIFS) beginning at the estimated end of the frame from the second STA, wherein a duration of the transmission is no longer than the SIFS, the transmission to the AP is on a same wireless communication channel as the frame from the second STA.

Example 2 includes the subject matter of Example 1, and optionally, wherein the transmission to the AP is configured to indicate a request to transmit data from the first STA to the AP.

Example 3 includes the subject matter of Example 2, and optionally, wherein the apparatus is configured to cause the first STA to attempt to receive from the AP a response to the request to transmit data from the first STA to the AP.

Example 4 includes the subject matter of Example 3, and optionally, wherein the response comprises a trigger frame from the AP, the trigger frame to trigger an Uplink (UL) transmission from the first STA.

Example 5 includes the subject matter of Example 3, and optionally, wherein the response comprises an acknowledgment (ACK) from the AP to acknowledge the request to transmit data from the first STA to the AP.

Example 6 includes the subject matter of Example 5, and optionally, wherein the apparatus is configured to cause the first STA to attempt to receive the ACK from the AP within an other SIFS, the other SIFS following an ACK from the AP to the second STA.

Example 7 includes the subject matter of any one of Examples 2-6, and optionally, wherein the transmission to the AP comprises a predefined signaling sequence to indicate the request to transmit data from the first STA to the AP.

Example 8 includes the subject matter of any one of Examples 2-7, and optionally, wherein the transmission to the AP comprises an indication of at least one parameter corresponding to the data from the first STA.

Example 9 includes the subject matter of Example 8, and optionally, wherein the indication of at least one parameter corresponding to the data from the first STA comprises an indication of at least one of a data size of the data from the first STA, or a Quality of Service (QoS) requirement.

Example 10 includes the subject matter of any one of Examples 1-9, and optionally, wherein the transmission to the AP comprises a data frame from the first STA.

Example 11 includes the subject matter of any one of Examples 1-10, and optionally, wherein the apparatus is configured to cause the first STA to identify the estimated end of the frame from the second STA based on a header of the frame from the second STA.

Example 12 includes the subject matter of any one of Examples 1-11, and optionally, wherein the apparatus is configured to cause the first STA to identify the estimated end of the frame from the second STA based on a detected signal level of the frame from the second STA.

Example 13 includes the subject matter of any one of Examples 1-12, and optionally, wherein a difference between the SIFS and the duration of the transmission is at least a predefined time duration.

Example 14 includes the subject matter of any one of Examples 1-13, and optionally, wherein the duration of the transmission is at least 2 microseconds shorter than the SIFS.

Example 15 includes the subject matter of any one of Examples 1-14, and optionally, wherein the SIFS is less than 20 microseconds.

Example 16 includes the subject matter of any one of Examples 1-15, and optionally, wherein the SIFS is 16 microseconds.

Example 17 includes the subject matter of any one of Examples 1-15, and optionally, wherein the SIFS is less than 16 microseconds.

Example 18 includes the subject matter of any one of Examples 1-17, and optionally, comprising a radio to transmit the transmission to the AP.

Example 19 includes the subject matter of Example 18, and optionally, comprising one or more antennas connected to the radio, and a processor to execute instructions of an operating system of the first STA.

Example 20 includes an apparatus comprising logic and/or circuitry configured to cause an Access Point (AP) to process a frame from a first wireless communication station (STA); and process a transmission from a second STA, the transmission from the second STA received within a Short-Inter-Frame-Space (SIFS) beginning at an end of the frame from the first STA, wherein a duration of the transmission from the second STA is no longer than the SIFS, the transmission from the second STA is on a same wireless communication channel as the frame from the first STA.

Example 21 includes the subject matter of Example 20, and optionally, wherein the apparatus is configured to cause the AP to identify based on the transmission from the second STA a request from the second STA to transmit data to the AP.

Example 22 includes the subject matter of Example 21, and optionally, wherein the apparatus is configured to cause the AP to transmit to the second STA a response to the request from the second STA.

Example 23 includes the subject matter of Example 22, and optionally, wherein the apparatus is configured to cause the AP to transmit the response comprising a trigger frame to trigger an Uplink (UL) transmission from the second STA.

Example 24 includes the subject matter of Example 22, and optionally, wherein the apparatus is configured to cause the AP to transmit the response comprising an acknowledgment (ACK) from the AP to acknowledge the request from the second STA.

Example 25 includes the subject matter of Example 24, and optionally, wherein the apparatus is configured to cause the AP to transmit a first ACK from the AP to the first STA to acknowledge the frame from the first STA, and to transmit a second ACK to the second STA within an other SIFS following the first ACK.

Example 26 includes the subject matter of any one of Examples 21-25, and optionally, wherein the apparatus is configured to cause the AP to identify the request from the second STA to transmit data to the AP based on a predefined signaling sequence in the transmission from the second STA.

Example 27 includes the subject matter of any one of Examples 21-26, and optionally, wherein the apparatus is configured to cause the AP to identify based on the transmission from the second STA an indication of at least one parameter corresponding to the data from the second STA, and to transmit to the second STA a trigger frame to trigger an Uplink (UL) transmission from the second STA based on the at least one parameter corresponding to the data from the second STA.

Example 28 includes the subject matter of Example 27, and optionally, wherein the at least one parameter corresponding to the data from the second STA comprises an indication of at least one of a data size of the data from the second STA, or a Quality of Service (QoS) requirement.

Example 29 includes the subject matter of any one of Examples 20-28, and optionally, wherein the transmission from the second STA comprises a data frame from the second STA.

Example 30 includes the subject matter of any one of Examples 20-29, and optionally, wherein a difference between the SIFS and the duration of the transmission is at least a predefined time duration.

Example 31 includes the subject matter of any one of Examples 20-30, and optionally, wherein the duration of the transmission is at least 2 microseconds shorter than the SIFS.

Example 32 includes the subject matter of any one of Examples 20-31, and optionally, wherein the SIFS is less than 20 microseconds.

Example 33 includes the subject matter of any one of Examples 20-32, and optionally, wherein the SIFS is 16 microseconds.

Example 34 includes the subject matter of any one of Examples 20-33, and optionally, wherein the SIFS is less than 16 microseconds.

Example 35 includes the subject matter of any one of Examples 20-34, and optionally, wherein the apparatus is configured to cause the AP to decode the transmission from the second STA in parallel to decoding of the frame from the first STA.

Example 36 includes the subject matter of any one of Examples 20-35, and optionally, comprising first Receive (Rx) circuitry to receive the frame from the first STA, and second Rx circuitry to detect the transmission from the second STA.

Example 37 includes the subject matter of any one of Examples 20-36, and optionally, comprising a radio to receive the frame from the first STA and the transmission from the second STA.

Example 38 includes the subject matter of Example 37, and optionally, comprising one or more antennas connected to the radio, and a processor to execute instructions of an operating system of the AP.

Example 39 includes a wireless communication device comprising the apparatus of any one of Examples 1-38.

Example 40 includes an apparatus comprising means for executing any of the described operations of any one of Examples 1-38.

Example 41 includes a product comprising one or more tangible computer-readable non-transitory storage media comprising computer-executable instructions operable to, when executed by at least one processor, enable the at least one processor to cause a computing device to perform any of the described operations of any one of Examples 1-38.

Example 42 includes an apparatus comprising: a memory interface; and processing circuitry configured to: perform any of the described operations of any one of Examples 1-38.

Example 43 includes a method comprising any of the described operations of any one of Examples 1-38.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising circuitry configured to cause a first wireless communication station (STA) to:
   identify an estimated end of a frame transmitted from a second STA to an Access point (AP); and
   transmit a transmission to the AP within a Short-Inter-Frame-Space (SIFS) beginning at the estimated end of the frame from the second STA, wherein a duration of the transmission is no longer than the SIFS, the transmission to the AP is on a same wireless communication channel as the frame from the second STA.

2. The apparatus of claim 1, wherein the transmission to the AP is configured to indicate a request to transmit data from the first STA to the AP.

3. The apparatus of claim 2 configured to cause the first STA to attempt to receive from the AP a response to the request to transmit data from the first STA to the AP.

4. The apparatus of claim 3, wherein the response comprises a trigger frame from the AP, the trigger frame to trigger an Uplink (UL) transmission from the first STA.

5. The apparatus of claim 3, wherein the response comprises an acknowledgment (ACK) from the AP to acknowledge the request to transmit data from the first STA to the AP.

6. The apparatus of claim 5 configured to cause the first STA to attempt to receive the ACK from the AP within another SIFS, the other SIFS following an ACK from the AP to the second STA.

7. The apparatus of claim 2, wherein the transmission to the AP comprises a predefined signaling sequence to indicate the request to transmit data from the first STA to the AP.

8. The apparatus of claim 2, wherein the transmission to the AP comprises an indication of at least one parameter corresponding to the data from the first STA.

9. The apparatus of claim 8, wherein the indication of at least one parameter corresponding to the data from the first STA comprises an indication of at least one of a data size of the data from the first STA, or a Quality of Service (QoS) requirement.

10. The apparatus of claim 1, wherein the transmission to the AP comprises a data frame from the first STA.

11. The apparatus of claim 1 configured to cause the first STA to identify the estimated end of the frame from the second STA based on a header of the frame from the second STA.

12. The apparatus of claim 1 configured to cause the first STA to identify the estimated end of the frame from the second STA based on a detected signal level of the frame from the second STA.

13. The apparatus of claim 1, wherein a difference between the SIFS and the duration of the transmission is at least a predefined time duration.

14. The apparatus of claim 1, wherein the duration of the transmission is at least 2 microseconds shorter than the SIFS.

15. The apparatus of claim 1, wherein the SIFS is less than 20 microseconds.

16. The apparatus of claim 1, wherein the SIFS is 16 microseconds.

17. The apparatus of claim 1 comprising a radio to transmit the transmission to the AP.

18. The apparatus of claim 17 comprising one or more antennas connected to the radio, and a processor to execute instructions of an operating system of the first STA.

19. A product comprising one or more tangible computer-readable non-transitory storage media comprising computer-executable instructions operable to, when executed by at least one processor, enable the at least one processor to cause a first wireless communication station (STA) to:
   identify an estimated end of a frame transmitted from a second STA to an Access point (AP); and
   transmit a transmission to the AP within a Short-Inter-Frame-Space (SIFS) beginning at the estimated end of the frame from the second STA, wherein a duration of the transmission is no longer than the SIFS, the transmission to the AP is on a same wireless communication channel as the frame from the second STA.

20. The product of claim 19, wherein the transmission to the AP is configured to indicate a request to transmit data from the first STA to the AP.

21. The product of claim 19, wherein the transmission to the AP comprises a data frame from the first STA.

22. An apparatus comprising circuitry configured to cause an Access Point (AP) to:
   process a frame from a first wireless communication station (STA); and
   process a transmission from a second STA, the transmission from the second STA received within a Short-Inter-Frame-Space (SIFS) beginning at an end of the frame from the first STA, wherein a duration of the transmission from the second STA is no longer than the SIFS, the transmission from the second STA is on a same wireless communication channel as the frame from the first STA.

23. The apparatus of claim 22 configured to cause the AP to identify based on the transmission from the second STA a request from the second STA to transmit data to the AP.

24. The apparatus of claim 23 configured to cause the AP to transmit to the second STA a response to the request from the second STA.

25. The apparatus of claim 22, wherein the transmission from the second STA comprises a data frame from the second STA.

* * * * *